(12) United States Patent
Sharp

(10) Patent No.: US 11,025,979 B2
(45) Date of Patent: Jun. 1, 2021

(54) CROWD SOURCED INDEXING AND/OR SEARCHING OF CONTENT

(71) Applicant: Roku, Inc., Saratoga, CA (US)

(72) Inventor: David Sharp, Saratoga, CA (US)

(73) Assignee: Roku, Inc., San Jose, CA (US)

( * ) Notice: Subject to any disclaimer, the term of this patent is extended or adjusted under 35 U.S.C. 154(b) by 398 days.

(21) Appl. No.: 15/249,985

(22) Filed: Aug. 29, 2016

(65) Prior Publication Data
US 2017/0060858 A1    Mar. 2, 2017

Related U.S. Application Data

(60) Provisional application No. 62/212,390, filed on Aug. 31, 2015.

(51) Int. Cl.
| | |
|---|---|
| *H04N 21/278* | (2011.01) |
| *H04N 21/25* | (2011.01) |
| *H04N 21/488* | (2011.01) |
| *H04N 21/439* | (2011.01) |
| *H04N 21/8405* | (2011.01) |
| *H04L 29/06* | (2006.01) |
| *H04N 21/845* | (2011.01) |

(Continued)

(52) U.S. Cl.
CPC ......... *H04N 21/278* (2013.01); *G06F 16/951* (2019.01); *H04L 65/4084* (2013.01); *H04N 21/251* (2013.01); *H04N 21/26603* (2013.01); *H04N 21/4394* (2013.01); *H04N 21/4884* (2013.01); *H04N 21/658* (2013.01); *H04N 21/8405* (2013.01); *H04N 21/8453* (2013.01)

(58) Field of Classification Search
CPC ............................ H04N 21/278; G06F 16/951
See application file for complete search history.

(56) References Cited

U.S. PATENT DOCUMENTS

| | | |
|---|---|---|
| 7,567,970 B2 | 7/2009 | Chung |
| 2008/0275906 A1 | 11/2008 | Rhoads et al. |

(Continued)

OTHER PUBLICATIONS

International Search Report and Written Opinion of the International Searching Authority for International Application No. PCT/US2016/049234, dated Nov. 30, 2016, 17 pages.

(Continued)

*Primary Examiner* — Van H Oberly
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for a crowd sourced indexing and/or searching of content. An embodiment operates by receiving one or more requests for content from one or more media devices, each request comprising content identifier information that identifies the content, determining whether crowd sourced content index information has been generated for the content, transmitting a response to the one or more media devices of the one or more media devices, in response to the one or more requests, the response comprising content location information and a content indexing request, and receiving content index information for the content identified by the content identifier information from the one or more media devices.

19 Claims, 10 Drawing Sheets

(51) Int. Cl.
*H04N 21/658* (2011.01)
*H04N 21/266* (2011.01)
*G06F 16/951* (2019.01)

(56) References Cited

U.S. PATENT DOCUMENTS

| | | |
|---|---|---|
| 2012/0096007 A1 | 4/2012 | Thambiratnam et al. |
| 2013/0110978 A1* | 5/2013 | Gordon .............. H04N 21/4627 709/218 |
| 2014/0089798 A1 | 3/2014 | Evans |
| 2014/0289226 A1 | 9/2014 | English et al. |
| 2015/0139610 A1* | 5/2015 | Syed ....................... G11B 27/11 386/241 |

OTHER PUBLICATIONS

Extended European Search Report for European application No. 16842747.4, dated Jan. 3, 2019, 7 pages.

Park, et al., "*Collaborative indexing over networked information resources by distributed agents*", Department of Computer Science, Korea Advanced Institute of Science and Technology, Distrib. Syst. Engng. 1, pp. 362-374, (1994).

\* cited by examiner

| Identifer Information | Content Index Information | |
|---|---|---|
| 140-1 | 140-1-1 | 140-1-2* ... 140-1-d |
| 140-2 | 140-2-1* | 140-2-2 ... 140-2-e |
| 140-3 | 140-3-1** | |
| ... | | |
| 140-c | | |

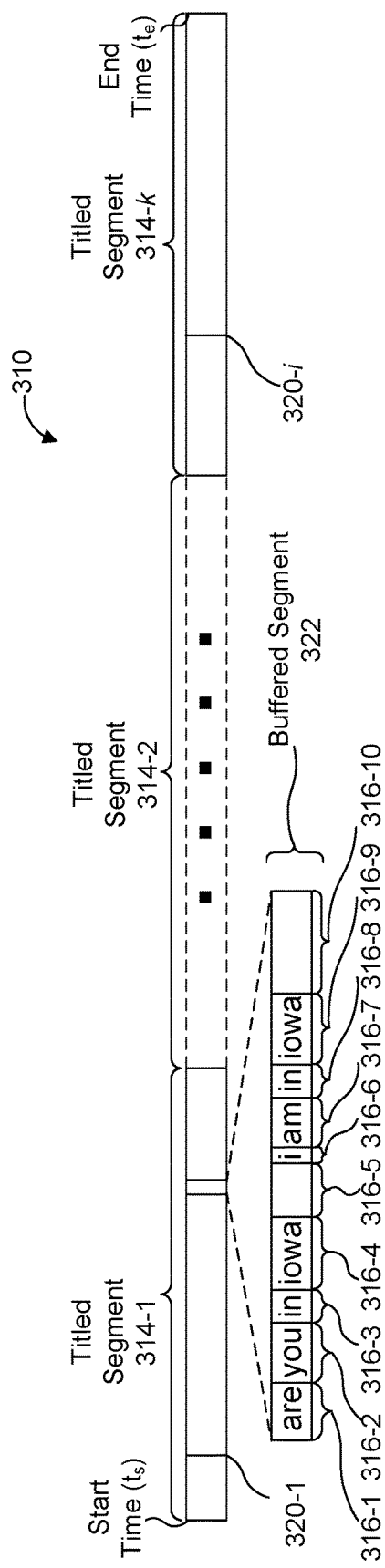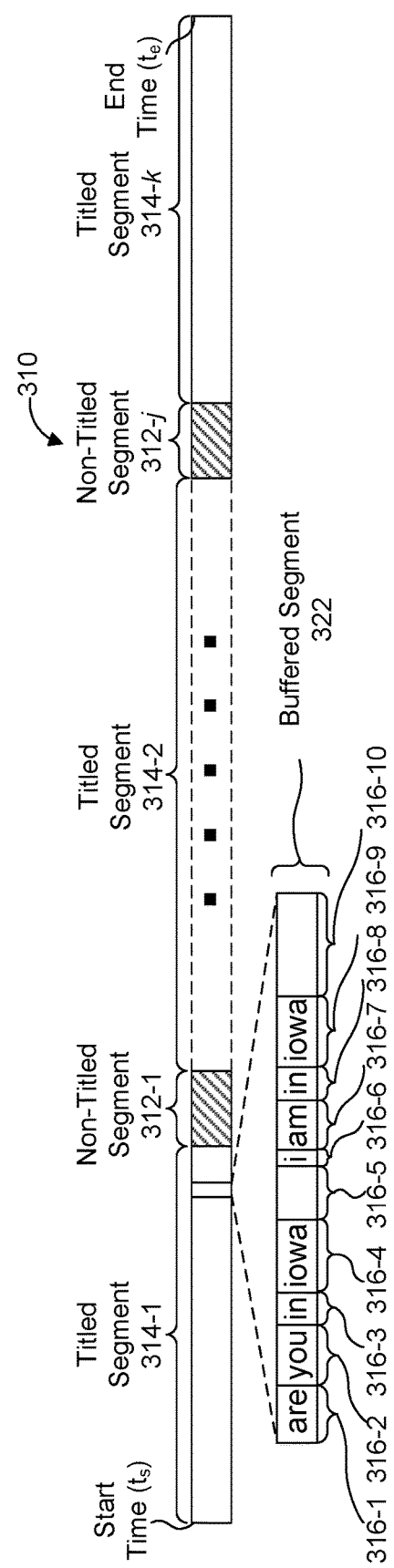

US 11,025,979 B2

CROWD SOURCED INDEXING AND/OR SEARCHING OF CONTENT

CROSS REFERENCE TO RELATED APPLICATION

This application claims the benefit of U.S. Provisional Application No. 62/212,390, filed on Aug. 31, 2015, which is herein incorporated by reference in its entirety.

BACKGROUND

Field

This disclosure is generally directed to crowd sourced indexing and/or searching. More particularly, this disclosure relates to crowd sourced indexing and/or searching of content.

Background

Consumer electronics such as, for example, high definition audio and/or video play back devices, may generally enable a user or consumer to watch or listen to their favorite content, such as, for example, music, movies, TV series, audio books, and/or the like by receiving or streaming the content for play back on their devices. In order to find content that may be of interest to the user or consumer, a user or consumer may typically perform a search for information that describes the content (e.g., title of the content, author of the content, brief description of the content, etc.) based on one or more keywords. However, valuable information that is within the content is typically unavailable for searching. Also, creating such information at a centralized location for an extensive and ever increasing collection of content may be a costly and substantial undertaking.

SUMMARY

Provided herein are system, apparatus, article of manufacture, method and/or computer program product embodiments, and/or combinations and sub-combinations thereof, for crowd sourced indexing and/or searching of content.

An embodiment includes a computer implemented method for a crowd sourced indexing and/or searching of content. The method may operate by receiving one or more requests for content from one or more media devices, each request comprising content identifier information that identifies the content, determining whether crowd sourced content index information has been generated for the content, transmitting a response to the one or more media devices of the one or more media devices, in response to the one or more requests, the response comprising content location information and a content indexing request, and receiving content index information for the content identified by the content identifier information from the one or more media devices.

Another embodiment includes a system for crowd sourced indexing and/or searching of content. The system may include at least one processor and a memory coupled to the at least one processor and configured to output audio and/or video information on a display device to play selected content, and generate content index information for the selected content based on the audio portion of the selected content, wherein the generated content index information for the selected content is used with other content index information generated for the selected content to determine crowd sourced content index information for the selected content.

A further embodiment includes a tangible computer-readable device having instructions stored thereon that, when executed by at least one computing device, causes the at least one computing device to perform operations. The operations may include outputting audio and/or video information on a display device to play selected content, and generating content index information for the selected content based on the audio portion of the selected content, wherein the generated content index information for the selected content is used with other content index information generated for the selected content to determine crowd sourced content index information for the selected content.

BRIEF DESCRIPTION OF THE FIGURES

The accompanying drawings are incorporated herein and form a part of the specification.

FIG. 1D illustrates a block diagram of content index information collection according to an example embodiment.

FIGS. 3A-B illustrate content information according to example embodiments.

Figure 1A:
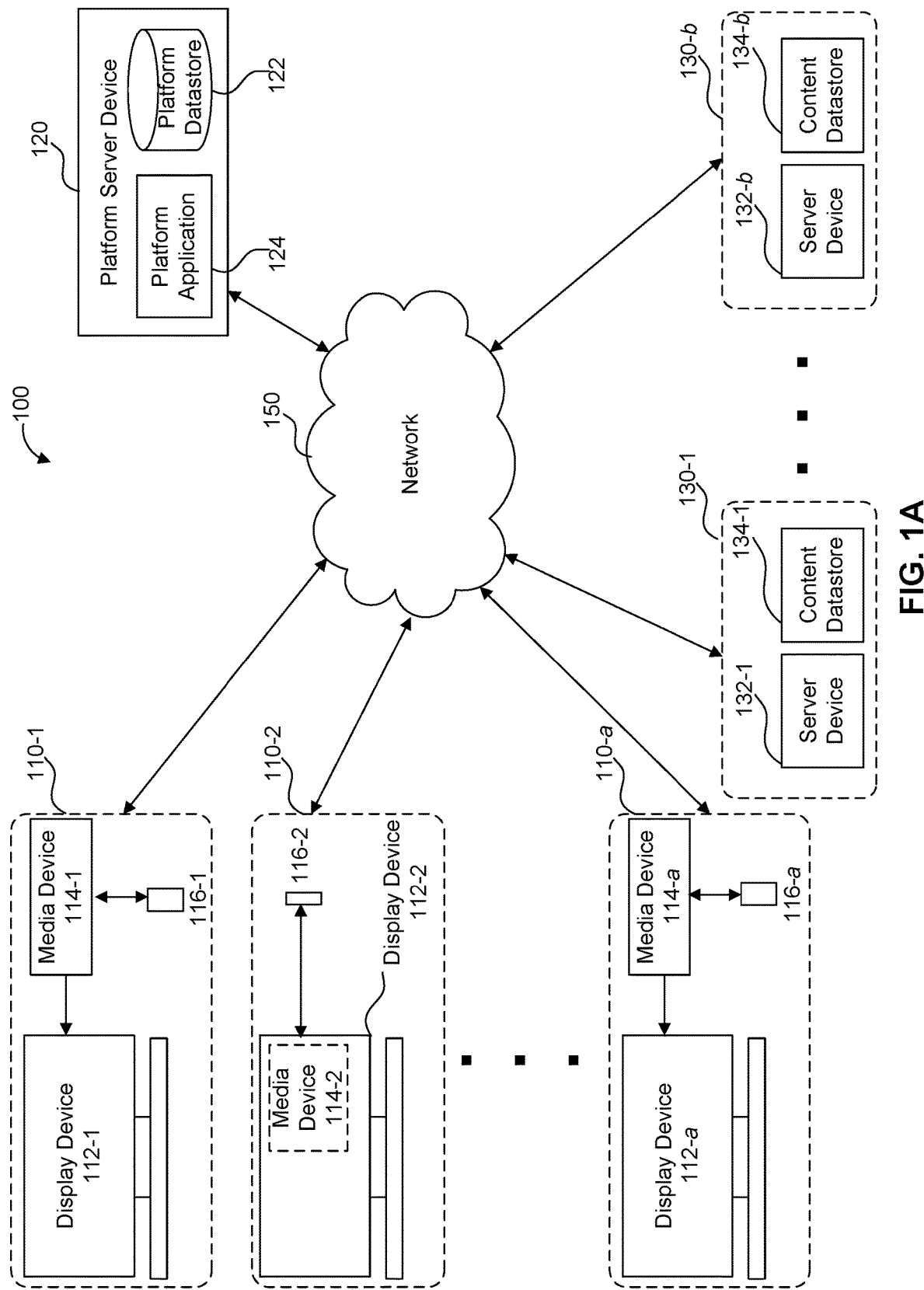
FIG. 1A illustrates a block diagram of a crowd sourced indexing system configured according to an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "a" and "b" and "c" and other similar designators are intended to be variables representing any positive integer. Thus, for example, if an implementation sets a value for a=4, then a complete set of elements 104-a may include elements 114-1, 114-2, 114-3, and 114-4.

DETAILED DESCRIPTION

FIG. 1 illustrates a block diagram of a crowd source indexing and/or searching system 100, according to an embodiment. In particular, the crowd source indexing and/or searching system 100 may include one or more interface systems 110-a, a platform server device 120, and one or more content source systems 130-b. In an embodiment, the interface systems 110-a may include, without limitation, display devices 112-a (e.g. a monitor, television, a projector, etc.), media devices 114-a (e.g. streaming devices, multimedia devices, audio/video playback devices, etc.), and/or control devices 116-a.

In an embodiment, the media devices 114-*a* may be integrated with, operatively coupled to, and/or connected to their respective display devices 112-*a*, control devices 116-*a*, and/or network 150. The media devices 150 may be configured to communicate with their respective display devices 112-*a* and network 150. In various embodiments, the network 150 may include, without limitation, a computer and/or telecommunications network which may enable coupled and/or interconnected systems and/or devices to communicate information between and among each other. In various embodiments, the network 150 may include, without limitation, intranet, extranet, Internet, and/or any other local, regional, global telecommunications network.

In an embodiment, the platform server device 120 may include, without limitation, a platform datastore 122 and a platform application 124. The platform datastore 122 may be configured to store platform information generally stored and for management of content, media devices, content source systems, users or consumers and further discussed with respect to FIG. 1C.

Figure 1C:
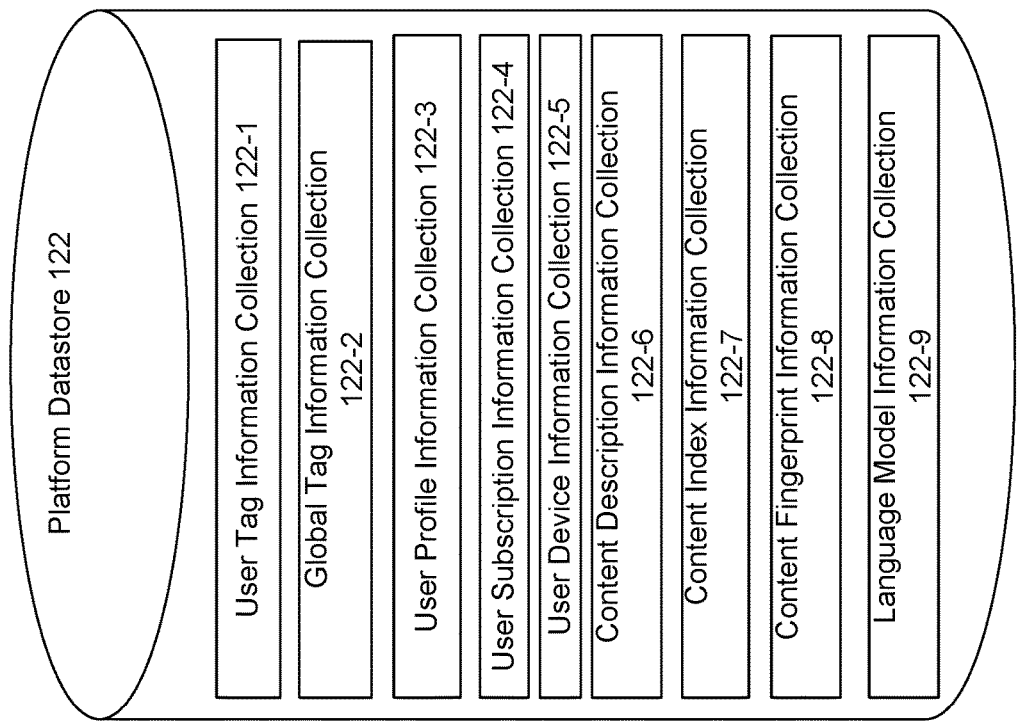
FIGS. 1B-C illustrate a block diagram of a platform server device configured according to an example embodiment.
Figure 1B:
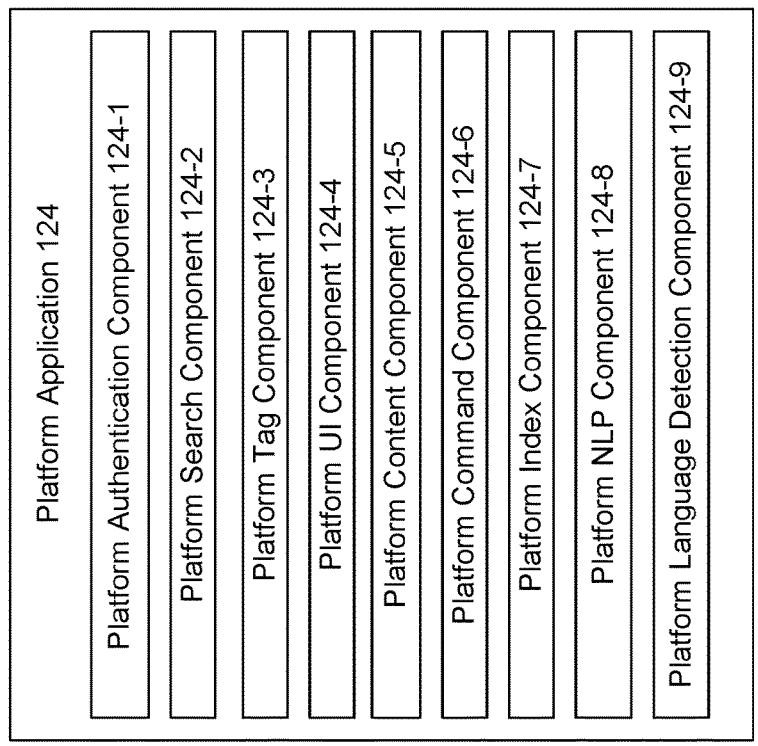

In an embodiment, the platform server device 120 may be configured to receive command information from media devices 114-*a* and may process the command information via the platform server application 124 further discussed with respect to FIG. 1B. In an embodiment, the media devices 114-*a* may be configured to aurally and/or graphically present user interfaces and/or content on respective display devices 112-*a* including any acoustic transducers (e.g., speakers, etc.) operatively coupled to the display devices 112-*a*.

For example, the media device 114-1 may be configured to acoustically, graphically, and/or visually present content on the display device 112-1 sourced from media device 114-1, the platform server device 120, and/or the one or more content source systems 130-*b*.

In addition to or alternative to the above example, the media device 114-1 may be configured to provide the one or more user interface (UI) views and/or UI elements and associated acoustic information to display device 112-1 for acoustical, graphical, and/or visual presentation, where the UI views, UI elements, and/or associated acoustic information may be generated by the platform server device 120, the one or more content source systems 130-*b*, or the media device 114-1.

In an embodiment, the control devices 116-*a* may be configured to communicate user input information with the respective media devices 114-*a* and may optionally include a touch screen display (not shown) and/or audio input and/or output (I/O) circuitry. For example, the control device 116-1 may be configured to utilize one or more wired and/or wireless communication protocols and/or standards, which may include, without limitation, infrared (IR) protocols and/or standards, radio frequency (RF) protocols and/or standards, and/or Bluetooth protocol and/or standard to communicate with the media device 114-1. In an embodiment, the control device 116-1 may be further configured to enable a consumer or user of a media device (e.g., media device 114-1) to navigate and/or make user selections from the UI views presented on a display device (e.g., display device 112-1).

Additionally or alternatively, the control device 116-1 itself may be configured to present at least a portion of the UI views on a touch screen display (not shown) connected and/or integrated with the control device 116-1 to enable a consumer or user of media device 114-1 to navigate, select, or otherwise interact with various content as previously discussed. Examples of control devices 116-*a* may include, without limitation, remote controls and/or mobile devices.

In an embodiment, the content source systems 130-*b* may include one or more content server devices 132-*b* and associated content datastores 134-*b*. In one embodiment, content location information which may include, without limitation, network address and/or path of content stored within the content datastores 134-*b*, may be maintained within the platform server device 120. In another embodiment, the network location of the content source systems 130-*b* is maintained and stored within the platform server device 120 while the specific locations of corresponding content are managed locally by the content source systems 130-*b*. In yet another embodiment, the content location information including the network location and/or path of the content source systems 130-*b* is embedded within the UI elements representative of selectable and/or viewable content displayed via the media devices 114-*a* and/or display devices 112-*a*, such that interaction with the UI elements through the media devices 114-*a* allows the selectable and/or viewable content located within the content source systems 130-*b* to be accessible to the media devices 114-*a*.

In an embodiment, the content stored within the content datastores 134-*b* may include music, video, multimedia, still pictures, text, graphics, gaming applications, and the like. In another embodiment, the particular content which is stored within the content datastores 134-*b* may be requested and provided to the media devices 114-*a* through the network 150.

By way of example, the media device 114-1 may communicate with platform server device 120 to request specific content for aural and/or graphical presentation on display device 112-1. If the requested content is audio/video content, the platform server device 120 may request the specific content from the one or more respective content source systems 130-*b* (e.g., content source system 130-1, etc.) via network 150, receive at least a portion of the specific content, and transmit or stream the at least a portion of the specific content to the media device 114-1 via network 150.

In addition to or alternative to the above example, the platform server device 120 may provide content location information including network address and/or path of the respective content source systems 130-*b* (e.g., content source system 130-1, etc.) to the media device 114-1, and the media device 114-1 may subsequently directly request the specific content from the one or more respective content source systems 130-*b* (e.g., content source system 130-1, etc.), and receive at least a portion of the specific content transmitted or streamed by the one or more respective content source systems 130-*b* to the media device 114-1 via network 150 for aural and/or graphical presentation on display device 112-1.

FIG. 1B illustrates a block diagram of an embodiment of the platform application 124 of the platform server device 120 illustrated in FIG. 1A. In an embodiment, the platform application 124 may be stored in the platform server device 120 and arranged for execution by the platform server device 120.

In an embodiment, the platform application 124 may include, without limitation, platform authentication component 124-1, platform search component 124-2, platform tag component 124-3, platform user Interface (UI) component 124-4, platform content component 124-5, platform command component 124-6, platform index component 124-7, platform natural language processing (NLP) component 124-8, and/or platform language detection component 124-9.

In an embodiment, the platform authentication component 124-1 may be arranged to communicate with one or more media devices 114-*a* and authenticate one or more users or consumers based on provided authentication information associated with the respective media devices 114-*a*. The authentication information may include information that enables the authentication component 124-1 to authenticate, authorize, and enable a user or consumer to securely connect to the platform server device 120 and access content stored in the content source systems 130-*b* for a particular user, consumer, and/or media device (e.g., media device 114-1, etc.).

In an embodiment, the authentication information may include, without limitation, user name, password, device identifier, IP addresses, email address, and/or the like. The authentication information may be stored in the platform datastore 122 as further discussed in FIG. 1C. Once authenticated, the platform application 124 may enable the user or consumer to purchase, search, retrieve, or otherwise access content stored in content systems 130-*b*.

In an embodiment, the platform search component 124-2 may be arranged to receive search requests from media devices 114-*a* to search for content and/or indexed information within content and provide search results to the one or more media devices 114-*a*. The search requests may include, without limitation, one or more search terms and/or phrases representative of one or more words, phrases, and/or sentences. In an embodiment, the search component 124-2 may be configured to match the one or more search terms and/or phrases or their equivalents (e.g., synonyms, etc.) utilizing for example, one or more search algorithms including natural language search algorithms, with content description information stored in the platform datastore 122.

In an embodiment, the platform search component 124-2 may also be configured to match the one or more search terms, phrases, and/or their equivalents (e.g., synonyms, etc.) utilizing for example, one or more search algorithms including natural language search algorithms, with the content index information stored in the platform datastore 122 and associated with content. In another embodiment, the search component 124-2 may also be configured to match the one or more search terms, phrases, and/or their equivalents (e.g., synonyms, etc.) utilizing for example, one or more search algorithms including natural language search algorithms, with only content index information that has been identified or determined to be reliable (i.e., reliable content index information or crowd sourced content index information).

Once the one or more search terms and/or one or more phrases match at least a portion of the content description information and/or content index information associated with a particular content, the platform search component 124-2 may be configured to provide at least a portion of the content description information and/or content index information that matches those search terms and/or phrases as search result information to the requesting media device (e.g., media device 114-1).

The platform tag component 124-3 may be arranged to enable a user or consumer to create tags associated with and/or within content, channels, and applications via the media devices 114-*a* utilizing the control devices 116-*a*. In an embodiment, user created tags may be represented as user tag information and stored in the platform datastore 122. The user created tags may be assigned to content, channels, and/or applications or within content, channel, and/or application to enable a consumer or a user to provide comments with respect to the content, channel, and/or application. In an embodiment, user created tags may only be visible or otherwise accessible to the user that created the tag. Additionally or alternatively, user created tags may be visible to both the user created the tag and all other users.

In an embodiment, the content providers, authors, artists, producers, production entities, may also create tags and assign tags to content or within to enable all consumers or all users to view or access the comments. In an embodiment, content provider, authors, artists, producers, and/or production entities created tags may be represented as global tag information stored in the platform datastore 122.

In an embodiment, the UI component 124-4 may be arranged to generate customized UI information for one or more of the media devices 114-*a*. The generated customized UI information may include content such as, for example, audio, visual, and/or gaming content for selection by the consumers or users of the one or more media devices 114-*a* utilizing, for example, respective control devices 116-*a*. The platform server device 120 may be further configured to provide the generated UI information to respective media devices 114-*a* for graphical and/or aural presentation via the respective display devices 114-*a*, which may enable a consumers or users to select and/or access content from the content source systems 130-*b*.

In an embodiment, the platform content component 124-5 may be arranged to receive requests from media devices 114-*a* to access content stored in content source systems 130-*b* and provide the requested content directly to the media device 114-*a* as previously discussed based on user subscription information stored in platform datastore 122 and further discussed with respect to FIG. 1C. Additionally or alternatively, the content component 124-5 may provide a response, where the response includes, without limitation, content location information. The content location information may include, without limitation, a network address and/or path of a particular content stored within the content datastores 134-*b*, so that the requesting media device (e.g., media device 114-1) may request to access the content and receive the content from content source system 130-*b* based on user subscription information stored in platform datastore 122 and further discussed with respect to FIG. 1C.

In an embodiment, the platform command component 124-6 may be arranged to process the command information received from media devices 114-*a*. The command information received from the media devices 114-*a* may include, without limitation, navigation commands and/or selection commands which may represent selection of content, request to access content, search for content, and/or an ongoing interaction with an application executing on the platform server device 120.

In an embodiment, the platform index component 124-7 may be generally arranged to manage distributed or crowd sourced indexing of content across one or more media devices 114-*a*. In an embodiment, the platform index component 124-7 may be configured to determine, for each content requested by a media device (e.g., media device 114-1, etc.), whether a reliable or crowd sourced content index information for the requested content has been previously generated. The content index information may include, without limitation, index description information, content index information, sub-content index information, and/or content phrase information further discussed with respect to FIG. 3C.

When a reliable or crowd sourced content index information has not been previously determined, the platform index component 124-7 may generate and transmit a content indexing request for the requesting media device (e.g., media device 114-1, etc.) to generate content index information for the requested content. The content index request may include, without limitation, content identifier information for identifying the requested content and language information associated with the requested content. The platform index component 124-7 may also receive generated content index information from one or more media devices 114-a and store the received content index information as content index information collection (e.g., content index information collection 122-7 further discussed with respect to FIG. 1C) in the platform datastore 122. Thus, the content index information collection may be representative of a crowd sourced content index collection for a variety of content that were received and crowd source indexed by the one or more media devices 114-a.

In an embodiment, the platform index component 124-7 may be configured to periodically (e.g., every hour, 12 hours, 24 hours, etc.) to determine a reliable content index information for content having previously generated content index information. Additionally or alternatively, the platform index component 124-7 may be configured to determine a reliable or crowd sourced content index information for content after a specific number (e.g., 5, 10, 15, 20, etc.) of content index information has been received for that content.

In an embodiment, the platform index component 124-7 may determine a reliable or crowd sourced content index information for content based on the index reliability information of the content index information determined by media devices 114-a.

In an embodiment, the index reliability information (e.g., index reliability information 354 illustrated in FIG. 3C) may include, without limitation, a normalized reliability information representative of the normalized reliability value, a content source identifier information that identifies the source of the content, recognition error information that identifies any errors during recognition of one or more terms, sub-contents, and/or phrases, network error information that identifies one or more network errors that may have occurred while receiving or streaming the content, and/or completeness information that identifies the percentage of content that was received and processed.

In an embodiment, the platform index component 124-7 may be configured to determine a reliable or crowd sourced content index information based on normalized reliability information. For example, the platform index component 124-7 may determine a reliable or crowd sourced content index information for a particular content based on the normalized reliability value (e.g., a numerical value between and including 0 to 100, where 100 is the most reliable, etc.), where the content index information with the highest reliability value for a particular content may be determined as the reliable or crowd sourced content index information.

Additionally or alternatively, the platform index component 124-7 may be configured to determine a reliable or crowd sourced content index information based on completeness information and/or content source identifier information for a particular content. For example, the platform index component 124-7 may determine a reliable or crowd sourced content index information for a particular content, where: (1) a threshold number (e.g., 5, 10, 20, etc.) of content index information for the particular content has been received; (2) each received content index information is generated from the same content source identified by the content source identifier information; (3) each of the received content index information from the same content source is substantially complete (e.g., 95% complete, 90% complete, etc.) as indicated by the completeness information; (4) and the content index information with the highest completeness information is identified as the reliable or crowd sourced content index information.

In an embodiment, once a reliable or crowd sourced content index information for a particular content has been identified and the normalized reliability value is above a specific threshold (e.g., 80 or higher, 90 or higher, etc.), the platform index component 124-7 may no longer request any media device to generate content index information for the particular content.

Additionally or alternatively, the platform index component 124-7 may also be configured to generate a reliable or crowd sourced content index information based on a plurality of received content index information. For example, the platform index component 124-7 may generate a reliable or crowd sourced content index information by performing a union of all received content index information for a particular content. Additionally or alternatively, the platform index component 124-7 may generate a reliable or crowd sourced content index information by performing an intersection for all a particular content, where the reliable or crowd sourced content index information includes only information that are the same for all received content index information for the particular content.

In an embodiment, once reliable or crowd sourced content index information for a particular content has been generated, the platform index component 124-7 may periodically request one or more media devices to generate content index information for the particular content, so that the generated reliable or crowd sourced content index information may be continuously updated.

Figure 3C:
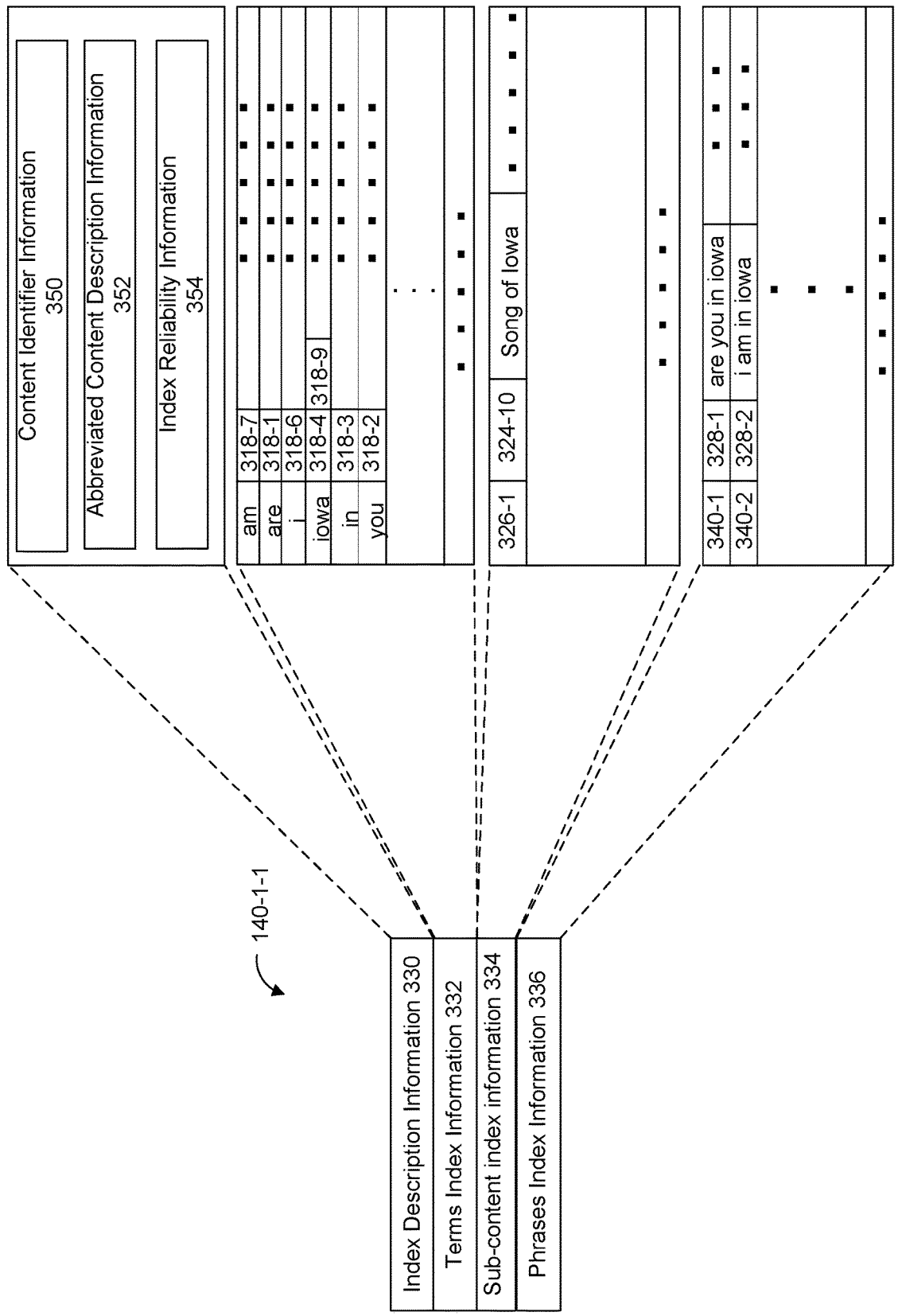
FIG. 3C illustrates content index information according to an example embodiment.

In an embodiment, the platform natural language processing (NLP) component 124-8 may be configured to analyze the reliable or crowd sourced content index information based on natural language processing algorithms to generate phrase index information (e.g., phrase index information 336 further discussed with respect to FIG. 3C). Moreover, the platform NLP component 124-8 may be configured to process the one or more terms in the terms index information (e.g., terms index information 332 further discussed with respect to FIG. 3C) and their associated term occurrence information into phrases represented as phrase information.

In an embodiment, the platform language detection component 124-9 may be configured to determine the language information associated with content requested for generation of content index information. In instances when the language associated with the content has already been identified in the content description information stored in the platform datastore 122, the language information includes the language as identified in the content description information.

In instances when the language associated with the content requested for generation of content index information is not identified in the content description information, the platform language detection component 124-9 may be configured to crowd source language detection by first assigning a different language for each content indexing request that is requesting the indexing of a particular content. The platform language detection component 124-9 may then be configured to determine the language for a particular content by comparing the index reliability information (e.g., recognition error information, normalized reliability information, etc.) for each received content index information generated in different languages for the same particular content. The platform language detection component 124-9 may be further configured to update the language information of the content description information for that particular content to the assigned language of in the content indexing request, when the content index information generated with the assigned language has a high normalized reliability value (e.g., greater than 90 percent, etc.) as indicated by the normalized reliability information and low recognition error as indicated by the recognition error information.

FIG. 1C illustrates a block diagram of an embodiment of the platform datastore 122 of platform server device 120. In particular, the platform datastore 124 may be implemented in the platform server device 120 and/or stored in the platform server device 120.

In an embodiment, the platform datastore 122 may include, without limitation, user tag information collection 122-1, global tag information collection 122-2, user profile information collection 122-3, user subscription information collection 122-4, user device information collection 122-5, content description information collection 122-6, content index information collection 122-7, content fingerprint information collection 122-8, and language model information collection 122-9.

In an embodiment, the user tag information collection 122-1 may include a collection of user tag information for each user or consumer. For example, the user tag information may include, without limitation, the content identifier information (e.g., hash, digest, etc.) that uniquely identifies a specific content accessible from one or more content source systems 130-b, user comment information representative of the actual comments of a user or consumer, and the comment time information identifying a particular time within the content that is associated with the user comment information.

In an embodiment, the global tag information collection 122-2 may include a collection of global tag information for each content. The global tag information may include, without limitation, the content identifier information as previously discussed, comment authorship information identifying a particular content provider, author, artist, producer, production entity, that authored the comment, global comment information representative of the actual comments of the particular content provider, author, artist, producers, production entities that created the comment, and the comment time information identifying a particular time within the content that is associated with the global tag information.

In an embodiment, the user profile information collection 122-3 may include a collection of user profile information for each user or consumer. The user profile information may include, without limitation, authentication information as previously discussed and demographic information. The demographic information may include personal information associated with a particular user or consumer which may include, without limitation, name and address information, age and gender information, and/or the like.

In an embodiment, the user subscription information collection 122-4 may include a collection of user subscription information for each user or consumer. The user subscription information may include purchased or otherwise authorized content of a user or consumer, and the one or more content source systems 130-b that the purchased or otherwise authorized content is available to the user or consumer. It may be appreciated that the user subscription may be further associated or linked to the particular user profile information for that user or consumer.

In an embodiment, the user device information collection 122-5 may include a collection of user device information for media devices 114-a associated with each user or consumer. The device information may include hardware, firmware, and/or software version information for one or more components of a media device (e.g., media device 114-1), media device identifier information, network address information, and/or the like.

In an embodiment, the content description information collection 122-6 may include a collection of content description information for each content. As previously discussed, the content description information may include without limitation, content identifier information (e.g., hash, digest, etc.) that uniquely identifies a specific content accessible from one or more content source systems 130-b, content title information identifying the title of the content, content author information identifying authors of the content, content language information identifying one or more languages of the audio or acoustic portions and/or visual or graphical portions of the content, time information identifying the total length of time of the content, content artist information identifying one or more artists and/or actors of the content, production information identifying the entities, producers, and/or persons that produced the content, content location information identifying one or more network addresses and/or paths of the respective content source systems 130-b that the specific content is accessible, content episode information identifying an episode the content belongs to, content season information identifying a season the content belongs to, content album information identifying an album the content belongs to.

In an embodiment, the content index information collection 122-7 may include one or more collection of content index information (e.g., content index information 140-1-1 illustrated in FIG. 3C, etc.) for each content in the content source systems 130-b.

In an embodiment, the content fingerprint information collection 122-8 may include a collection of content fingerprint information. The content fingerprint information may include acoustic signature information that may be utilized by the one or more media devices 114-a to identify additional sub-content (e.g., music, movies, songs, etc.) within a particular content. It may be appreciated that the content fingerprint information collection 122-8 may be periodically transmitted to the one or more media devices 114-a to ensure that the one or more media devices 114-a may perform the recognition of sub-content utilizing the latest content fingerprint information collection 122-8.

In an embodiment, the language model information collection 122-9 may include a collection of language model information. The language model information may include language specific speech recognition information for identifying utterances in audio portion of the content that may be utilized by the one or more media devices 114-a to identify one or more terms in the content. It may be appreciated that at least a portion of the language model information collection 122-9 may also be periodically transmitted to the one or more media devices 114-a to ensure that the one or more media devices 114-a may perform the recognition of one or more utterances utilizing the latest language model information collection 122-9.

FIG. 1D illustrates a block diagram of an embodiment of the content index information collection 122-9 stored in platform server datastore 122 in an example embodiment.

In an embodiment, the content index information collection 122-9 may include one or more content index entries (illustrated as one or more rows), where each content index entry (illustrated as a row) further includes, without limitation, content identifier information 140-c (e.g., content identifier information 140-1, 140-2, 140-3, etc.) and one or more content index information (e.g., content index information 14-1-d, 140-1-e, etc.) associated with the content identifier information. Thus, for any given content identified by the content identifier information in the content index information collection 122-9, the content index information collection 122-9 may be configured to store one or more content identifier information generated by and received from one or more media devices 114-*a*.

In an embodiment, for a given content identified by the content identifier information in the content index information collection 122-9, the content index information collection 122-9 may also indicate or identify a reliable or crowd sourced content index information (e.g., content index information 140-1-2 140-2-1, and 140-3-1 illustrated with an asterisk in FIG. 1D) determined by the platform index component 124-7 as previously discussed. Additionally, it may be appreciated the content index information collection 122-9 may also indicate or identify a reliable or crowd sourced content index information (e.g., content index information 140-3-1 illustrated with a double asterisk in FIG. 1D) that is generated by performing a union or intersection of received content index information also previously discussed.

Figure 2:
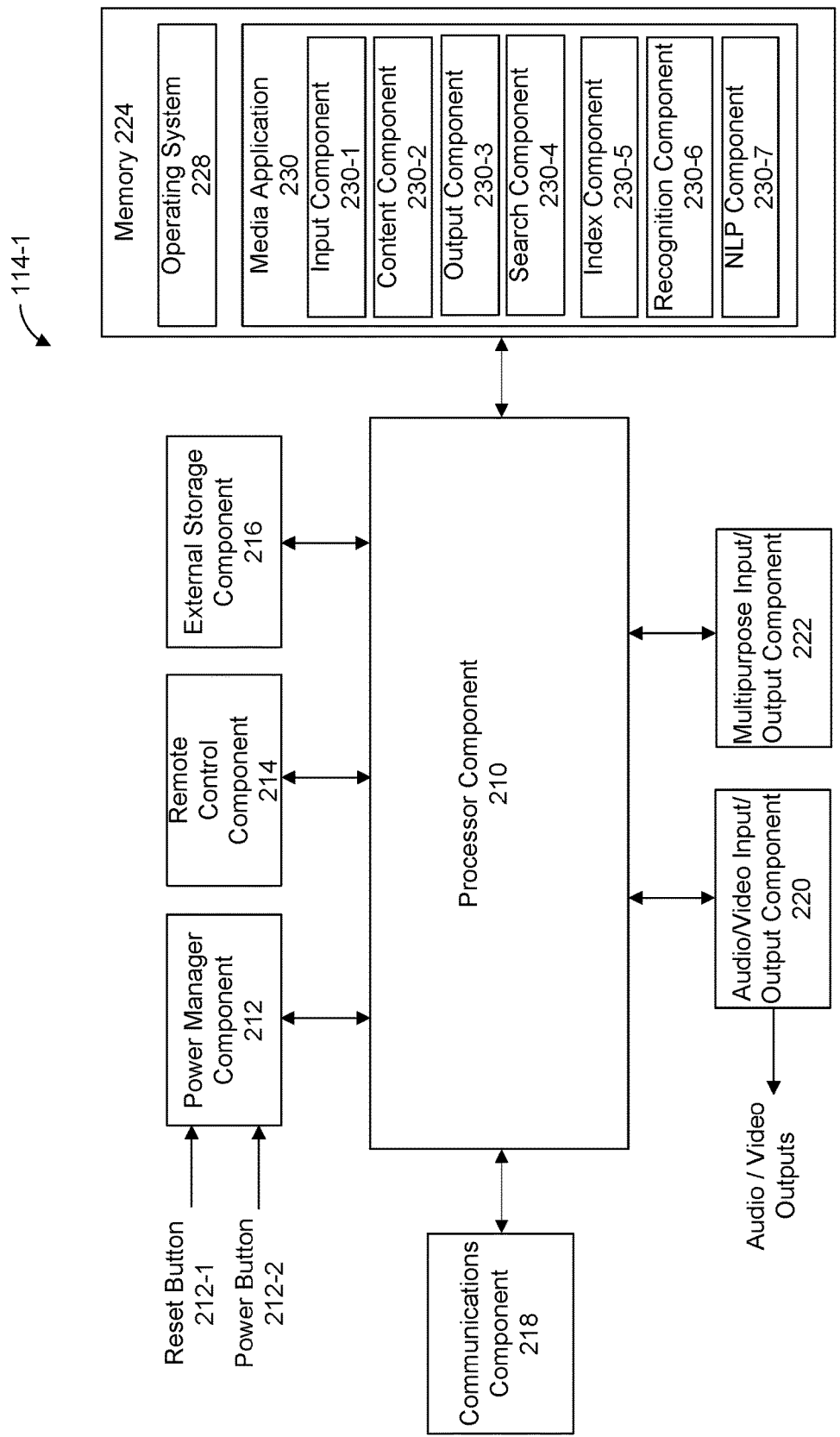
FIG. 2 illustrates a block diagram of an embodiment of the media device in an example embodiment.

FIG. 2 illustrates a block diagram of an embodiment of the media device 114-1 in an example embodiment. It may be appreciated that while FIG. 2 illustrates an embodiment for the media device 114-1, other media devices 114-*a* may be configured substantially similar to the embodiment illustrated in FIG. 2 for media device 114-1.

In an embodiment, the media device 114-1 may be configured to communicate with their respective display devices 112-*a* and platform server device 124 and content source systems 130-*b* via network 150 in order to provide requested content for auditory graphical, and/or visual presentation on their respective display devices 112-*a*. The media device 114-1 may include, but is not limited to, memory 224, processor component 210, communications component 218, audio/video (A/V) input/output (I/O) component 220, multipurpose input/output (I/O) component 222, power manager component 212, remote control component 214, external storage component 216, each of the components and memory 252 may be operatively connected and/or coupled to each other.

In an embodiment, the processor component 210 may be generally arranged to execute instruction information including one or more instructions. In an embodiment, the processor component 210 may be a low power processor component or system-on-chip (SoC) processor component which may comprise, among other elements, processor circuit, which may include, but is not limited to, at least one set of electronic circuits arranged to execute one or more instructions. Examples of processor components 210 may include, but are not limited to, Qualcomm® Snapdragon®, Nvidia® Tegra®, Intel® Atom®, Samsung® Exynos, Apple® A7®, Apple® A8®, or any other type of mobile processor(s) arranged to execute the instruction information including the one or more instructions stored in memory 224.

In an embodiment, the memory 224 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., universal serial bus (USB) memory, solid state drives (SSD), etc.), and/or any other type of storage media configured for storing information.

In an embodiment, the communications component 218 may be generally arranged to enable the media device 114-1 to communicate, directly and/or indirectly, with platform server device 120, and/or content source systems 130-*b*. The communications component 218 may include, among other elements, a radio frequency circuit configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the communications component 218 may be further include network interface circuit encoding and/or decoding information and receiving and/or transmitting the encoded information as electrical and/or optical signals consistent with one or more wired and/or optical network standards (e.g., Ethernet, Fibre Channel, etc.).

In an embodiment, the power manager component 212 may be generally arranged to manage the media device 114-1 in one or more power states and transitioning between the one or more power states. The one or more power states may include, without limitation, reset state, sleep state, power on state, and/or power off state. The power management component 212 may further be may also be operatively coupled to a power button 212-1 to transition the media device 114-1 between powered on state, sleep state, and/or power off state. The power management component 212 may also be operatively coupled to a reset button 212-2 to transition the media device 114-1 to a reset state which may be followed by the power on state.

In an embodiment, the remote control component 214 may be generally arranged to receive user input information from control device 116-1. The remote control component 214 may be configured to utilize one or more wireless communication protocols and/or standards, which may include, without limitation, infrared (IR) protocols and/or standards, radio frequency (RF) protocols and/or standards, and/or Bluetooth protocol and/or standard to communicate with the control device 116-1.

In an embodiment, the external storage component 216 may be generally arranged to store information in volatile and/or nonvolatile memory as previously discussed with respect to memory 224. Additionally or alternatively, the external storage component 216 may be further operatively coupled to external storage components (not shown) such as, for example, USB memory, SSD, hard disk drives (HDD), secure digital (SD) nonvolatile memory, and the like. The stored information may include, without limitation, information received from platform server device 120, content source systems 130-*b*, one or more components and/or operating systems stored in memory 224, information generated by the one or more components and/or operating systems stored in memory 224, content, and/or the like.

In an embodiment, the A/V I/O component 220 may be generally arranged to communicate audio and/or video information operatively coupled to one or more components and/or devices. For example, the A/V I/O component 220 may be configured to output audio information and/or video information to display device 112-1 for acoustic, auditory, graphical, and/or visual presentation on the display device 112-1. The display device 112-1 may be operatively coupled and/or connected to the A/V 10 component 220 via one or more audio and/or video interfaces.

In an embodiment, the one or more audio and/or video interfaces may include, without limitation, high definition multimedia interface (HDMI), display port (DP), Red-Green-Blue (RGB) component video, Separate Video (S-video), Digital Visual Interface (DVI), Video Graphics Array (VGA), Mobile High-Definition Link (MHL), composite video, analog audio, and/or Sony®/Philips® Digital interface (S/PDIF) digital audio, USB, Apple® Thunderbolt®, and/or the like.

In an embodiment, the multipurpose I/O component 222 may be generally arranged to communicate with one or more external devices via one or more interfaces. The one or more interfaces may include, without limitation, USB, Apple® Thunderbolt®, and/or the like. The one or more external devices (not shown) may include, without limitation, keyboards, mice, cameras, microphone and the like.

In an embodiment, the memory 224 may include instruction information arranged for execution by the processor component 210. In that embodiment, the instruction information may be representative of at least one operating system 228, one or more applications, which may include, but is not limited to, media application 230.

In an embodiment, the operating system 288 may include, without limitation, embedded operating systems (e.g., Apple®, iOS®, Google® Android®, HP® WebOS®, Microsoft® Windows Embedded®, Microsoft® Windows®, Linux, etc.) general arranged to manage hardware resources (e.g., one or more components of the media device 114-1) and/or software resources (e.g., one or more applications of the media device 114-1).

In an embodiment the media application 230 may be generally arranged to enable a user or consumer to authenticate to the platform server device 120 and enable a user or consumer to search, select, and/or playback of content received the platform server device 120 and/or one or more content source systems 130-b.

The media application 230 may include, without limitation, an input component 230-1, a content component 230-2, an output component 230-3, a search component 230-4, an index component 290-5, audio recognition component 230-6, and/or optionally, a natural language processing (NLP) component 230-7.

In an embodiment, the input component 230-1 may be generally arranged to interface with remote control component 214 and/or multipurpose I/O component 222 to receive user or consumer and/or process one or more commands including navigation commands and/or selection commands which may represent selection of content, search for content, and/or an ongoing interaction with an application executing on the platform server device 120.

In an embodiment, the content component 230-2 may be generally arranged to receive, buffer, store, and/or stream a user or consumer selected content from the platform server device 120 and/or one or more content source systems 130-b. The content component 230-2 may be also be generally arranged to provide the received, buffered, stored, and/or streamed content to display component 230-3 for auditory, aural and/or graphical presentation on a display device (e.g., display device 112-1) operatively coupled to the media device 114-1.

In an embodiment, the output component 230-3 may be generally arranged to generated audio and/or video information based on content received, buffered, stored, and/or streamed from platform server device 120 and/or one or more content source systems 130-b. Additionally, the output component 230-3 may also be generally arranged to generate audio and/or video information based on content stored in memory 224 and/or memory operatively coupled to the external storage component 216. The output component 230-3 may be further arranged to generate the audio and/or video information based on customized UI information representative of one or more UI views (e.g., UI views illustrated in FIG. 5A-5C) including one or more UI elements received from platform server device 120 and/or generated by one or more components of memory 224 and/or operating system 228.

In an embodiment, the output component 230-3 may be arranged to provide the generated audio and/or video information to a display device (e.g., display device 112-1) operatively coupled to the A/V I/O component 220 in order to aurally and/or graphically present at least a portion of the generated audio and/or video information on the display device (e.g., display device 112-1).

In an embodiment, the search component 230-4 may be generally arranged to communicate with the platform server device 120. In an embodiment, the search component 230-4 may be configured to receive one or more search queries from the user or consumer via the input component 230-1, where each search query may include, without limitation, one or more search terms and/or phrases. The search component 230-4 may be further configured to transmit the one or more search queries to the platform search component 124-2, where the platform search component 124-2 performs a search based on the received one or more search queries. The search component 230-4 may be further configured to receive one or more search results from the platform search component 124-2, in response to the transmission of the one or more search queries.

In an embodiment, the index component 230-5 may be generally arranged to create content index information based on user or consumer selected content for playback on the media device 114-1. The content index information may include, without limitation, description information, terms index information, phrases index information, sub-content index information further discussed with respect to FIG. 3C.

In an embodiment, the index component 230-5 may be configured to index the content by generating the terms index information (e.g., one or more terms, etc.), sub-content index information (e.g., audio sub-content such as music, etc.), and/or optionally, phrases index information (e.g., one or more phrases, etc.) for the audio portion of the content, in response to receiving at least a portion of the user or consumer selected content and a content indexing request.

As previously discussed, the content indexing request received from the platform server device 120 may include at least a portion of content description information which may include, without limitation, content identifier information identifying the user or consumer selected content, and language information indicating the language of the user or consumer selected content.

In an embodiment the index component 230-5 may be further configured to generate terms index information and/or sub-content index information for the audio portion of the content, by buffering or storing at least a portion of the received or streamed content in a recognition buffer (not shown) implemented in memory 224 and/or memory coupled to the externals storage component 216. In an embodiment, the recognition buffer may be a circular buffer, a first in first out (FIFO) buffer, and/or the like, and may be configured to buffer or store at least a portion of the received or streamed content (e.g., 5 seconds, 10 seconds, 20 seconds, etc.), for recognition and/or processing.

In an embodiment, the index component 230-5 may be configured to generate terms index information, by utilizing the audio recognition component 230-6, to recognize, in the recognition buffer, the one or more terms and determine the term occurrence information which may include, without limitation, approximate term occurrence start time and term occurrence start time end time for each term.

It may be appreciated that instances where closed captioning information and/or subtitle information are available with the content, the index component 230-5 may be configured to utilize the closed captioning information and/or subtitle information to generate terms index information or supplement the terms index information generated utilizing the audio recognition component 230-6 with the closed captioning information and/or subtitle information for any terms that were not properly recognized.

Additionally or alternatively, the index component 230-5 may also be configured to generate the sub-content index information, by utilizing the audio recognition component 230-6, in the buffer, sub-content and determine sub-content occurrence information which may include, without limitation, the approximate sub-content occurrence start time and sub-content occurrence start time end time for each sub-content.

In an embodiment and after recognizing, utilizing the audio recognition component 230-6, one or more terms and/or sub-content in the recognition buffer, the index component 230-5 may be further configured to store and/or update at least a portion of the terms index information and/or sub-content index information as illustrated in FIG. 3C.

It may be appreciated that as the audio recognition component 230-6 processes the buffered portion of the received or streamed content for one or more terms and/or sub-content, the index component 230-5 may be configured to empty or clear at least a portion of the buffer that has already been processed. The index component 230-5 may then further buffer or store the next portion of received or streamed content for processing by the audio recognition component 230-6 until all received or streamed content has been processed. During chronological playback of the content, these interactions may be repeated until the entire content has been received, streamed, and processed.

It may be further appreciated that the index component 230-5 may be configured to utilize the audio recognition component 230-6 to generate the terms index information and/or the sub-content index information simultaneous or contemporaneous with respect to the playback of the user or consumer selected content. However, in some embodiments and depending on at least the size of the recognition buffer, the portion being currently processed by the index component 230-5 may be time delayed with respect to the portion of the content that is being played back on a display device (e.g., display device 112-1).

For example, the output component 230-3 may output the received or streamed content for aural and/or graphical presentation on a display device 112-1 while the index component 230-5 generates the terms index information based on at least a portion of the content stored in the recognition buffer that is time delayed (e.g., 5 seconds, 10 seconds, 20 seconds, etc.), where the time delay may be dependent on the size of the recognition buffer.

In an embodiment, the index component 230-5 may be further optionally configured to generate the phrases index information utilizing the natural language processing (NLP) component 230-7 to analyze at least a portion of the terms index information to recognize phrases and determine phrase occurrence information which may include, without limitation, approximate the phrase occurrence start time and phrase occurrence start time end time for each recognized phrase.

It may be appreciated that if phrases index information is not required to be generated whether by the NLP component 230-7 or by the platform NLP component 124-8, then the index component 230-5 may be configured to omit one or more terms from the terms index information. For example, index component 230-5 may be configured to omit the indexing of article terms (e.g., "an," "a," "the," etc.), when phrases index information is not required to be generated.

In an embodiment, the audio recognition component 230-6 may be generally arranged to recognize one or more terms and/or sub-content within the audio portion of content received, buffered, and/or streamed from the platform server device 120 and/or one or more content source systems 130-b. In an embodiment, the audio recognition component 230-6 may be configured to recognize one or more utterances (e.g., spoken words, etc.) in the recognition buffer utilizing statistics based speech recognition algorithms (e.g., hidden markov model, etc.) and a language model for a specific language specified in the language information.

In an embodiment, the audio recognition component 230-6 may further determine term occurrence information which may include, without limitation, approximate term occurrence start time and approximate term occurrence end time for each term. It may be appreciated that the audio recognition component 230-6 may include one or more language models and each language model may include, without limitation, speech recognition information for a specific language.

Additionally or alternatively, the audio recognition component 230-6 may be further configured to recognize sub-content utilizing, for example, acoustic fingerprinting algorithms based on content fingerprint information. The audio recognition component 230-6 may be further configured to determine sub-content occurrence information which may include, without limitation, approximate sub-content occurrence start time and approximate sub-content occurrence end time for each term.

It may be appreciated that one or more language models represented as language model information and/or content fingerprint information may be manually, automatically, and/or periodically received from the platform server device 120. The received language model information and/or content fingerprint information may be stored in memory 224 or memory operatively coupled to the external storage component 216 to enable the audio recognition component 230-6 to recognize terms and sub-content utilizing up to date recognition algorithms.

In an embodiment, the optional NLP component 230-7 may be generally arranged to recognize one or more phrases based on the terms index information generated by the indexing component 230-5. In an embodiment, the optional NLP component 230-7 may be configured to determine one or more phrases and determine phrase occurrence information which may include, without limitation, approximate phrase occurrence start time and phase occurrence end time for each phrase by utilizing statistical machine learning algorithms.

FIGS. 3A-B illustrate a block diagram of content information in example embodiments.

In an embodiment, the content, represented as content information, may be associated with a start time ($t_s$) and an end time ($t_e$) and may include one or more of titled segments 314-$k$ such as, for example, titled segments 314-1 and 314-2. The one or more titled segments 314-$k$ may represent the content that the user or consumer selected for play back on a display device (e.g., display device 112-1).

In an embodiment, the received content may include, without limitation, one or more non-titled segments 320-$i$ to indicate the time points of when a non-titled segment (e.g., advertisement, announcements, etc.) may be separately received or streamed and subsequently outputted on a display device (e.g., display device 112-1, etc.).

Additionally or alternatively, the received content may also include, without limitation, one or more non-titled segments 312-$j$ embedded within the received content, to indicate the time points of when a non-titled segment within the received content may be received or streamed and subsequently outputted on a display device (e.g., display device 112-1, etc.).

In an embodiment, buffered segment 322 may be representative of a current portion that is buffered within a recognition buffer (not shown) implemented in memory 224 and/or memory coupled to the externals storage component 216. It may be appreciated that when a user or consumer is viewing and/or listening to the content from start to finish, the buffered segment 322 may move from the start time ($t_s$) to the end time ($t_e$) as the content is received or streamed from the platform server device 120 or one or more content source systems 130-$b$ and further processed by the index component 230-5 and audio recognition component 230-6.

In an embodiment, the buffered segment 322 may include one or more sub-segments 316-1 through 316-10, which may be representative of one or more utterances of spoken words in the audio portion of the content. As previously discussed, the audio recognition component 230-6 may be configured to recognize the one or more terms in one or more utterances (e.g., utterances in sub-segments 316-1 through 316-10) of spoken words, and determine the term and term occurrence information corresponding to the utterances within the buffered segment 322. Also previously discussed, the audio recognition component 230-6 may be further configured to recognize sub-content in the buffered segment 322 (e.g., sub-content in sub-segments 316-1 through 316-10) and determine the sub-content and sub-content occurrence information corresponding to sub-content within the buffered segment 322.

It may be appreciated that the audio recognition component 230-6 may determine the term occurrence start time, term occurrence end time, sub-content occurrence start time, sub-content occurrence end time, phrase occurrence start time, and/or phrase occurrence end time based on the start time ($t_s$) of the content, and may exclude any non-titled segments 320-$i$ or non-titled segments 312-$j$. Thus, the audio recognition component 230-6 may also be configured to disable or exclude the recognition of any non-titled segments 320-$i$ or non-titled segments 312-$j$.

It may be further appreciated that by utilizing the audio recognition component 230-6 analyzing the audio portion of the received content to index the content while the content is being played back on a display device (e.g. display device 112-1), the media device (e.g., media device 114-1) may utilize existing network bandwidth for receiving the content information representative of the content and any existing idle processing resources of the processor component 210 to index the content.

Additionally, in embodiments where the indexing of the received content is substantially performed only during play back of the content, the media device may also ensure that available processing resources of the processor component 210 will not be diminished and will be available for other components and/or functionality (e.g., execution of applications, searching for additional content, etc.) of the media device (e.g., media device 144-1), when the content is not being play back.

FIG. 3C illustrates a block diagram of the content index information in an example embodiment. It may be appreciated that while only a single example of the content index information has been illustrated in FIG. 3C, the index component 230-5 of one or more media devices 114-$a$ may be configured to generate content index information for a variety of content. Thus, the example should not be limited to this context.

In an embodiment, the content index information 140-1-1, may include index description information 330, terms index information 332, phrases index information 336, and sub-content index information 334.

The index description information 330 may include, without limitation, content identifier information 350 that identifies a particular content associated with the content index information 140-1-1, abbreviated content description information 352 which may include, at least a portion of the content description information (e.g., title information, author information, artist information, production information, etc.) and index reliability information 354 that identifies the reliability of the content index information.

In an embodiment and as previously discussed, the index reliability information 354 may include, without limitation, a normalized reliability information representative of the normalized reliability value, a content source identifier information that identifies the source of the content, recognition error information that identifies any errors during recognition of one or more terms, sub-contents, and/or phrases, network error information that identifies one or more network errors that may have occurred while receiving or streaming the content, and/or completeness information that identifies the percentage of content that was received and processed.

In an embodiment, the index component 230-5 may be configured to determine the normalized reliability information based on the recognition error information, content source identifier information, network error information, and/or completeness information. For example, content index information generated from content received from content sources identified by the content source identifier information that are less reliable than other content sources may be associated with a lower normalized reliability value than content received from content sources that are more reliable. In another example, content index information generated with high percentage of recognition errors (e.g., high number of recognition errors per minute of content, etc.) may be associated with a lower normalized reliability value than those with low percentage of recognition errors. In a further example, content index information generated from content that was received or streamed with high number of network errors (e.g., high number of network errors per minute of content, etc.) may be associated with a lower normalized reliability value than those with low percentage of network errors. In still another example, content index information generated from content that was only partially received and processed (e.g., low percentage of overall content received) may be associated with a lower normalized reliability value than those that have been fully received and processed.

In an embodiment, the terms index information 332 may include one or more term entries (illustrated as one or more rows), where each term entry (i.e., a row) may include term information identifying the term in the term entry (e.g., "am," etc.) and term occurrence information 318 as recognized and determined by the audio recognition component 230-6. As illustrated in FIG. 3C, the term occurrence information 318-1 through 318-4 and term occurrence information 318-6 through 318-9 may correspond to the one or more utterances that were recognized in the one or more sub-segments 316-1 through 316-4 and sub-segments 316-6 through 316-9 of FIGS. 3A-B. Thus, each term occurrence information 318 (e.g., term occurrence information 318-1 through 318-4 and term occurrence information 318-6 through 318-9) may include the term occurrence start time and term occurrence end time for the term (e.g., "am," etc.) recognized in the content. In an embodiment, the one or more term entries may also be sorted by the terms, such as, for example, in alphabetical order for the English language, to facilitate searching by an appropriate searching algorithm.

In an embodiment, the sub-content index information 334 may include one or more sub-content entries (illustrated as one or more rows), where each sub-content entry (i.e., a row) includes a sub-content identifier information 326-1 of the one or more sub-content that may identify the sub-content in the content fingerprint information collection 122-8, sub-content occurrence information 324, title information (e.g., "Song of Iowa", etc.) that identifies the title of the sub-content, or any other information that may assist in identification and searching of sub-content. As illustrated in FIG. 3C, the sub-content occurrence information 324-10 may correspond to sub-content (e.g., a song titled "Song of Iowa", etc.) that was recognized in sub-segment 316-10. Thus, each sub-content occurrence information 324 (e.g., sub-content occurrence information 324-10) may include the sub-content occurrence start time and sub-content occurrence end time for the sub-content (e.g., a song titled "Song of Iowa", etc.) recognized in the content. In an embodiment, the one or more sub-content entries may also be sorted, such as, for example, in chronological order based on the sub-content occurrence information 324.

In an embodiment, the phrase index information 336 may include one or more phrase entries (illustrated as one or more rows), where each phrase entry (i.e., a row) includes a phrase identifier information 340 that identifies a particular phrase, a phrase occurrence information 328, and phrase information (e.g., "are you in iowa", etc.) that is representative of the actual recognized phrase. Thus, each phrase occurrence information (e.g., phrase occurrence information 328-1, etc.) may include the phrase occurrence start time and phrase occurrence end time for the phrase (e.g., the phrase "are you in iowa", etc.). It may be appreciated that the phrase occurrence start time and phrase occurrence end time may be determined by the NLP component 230-7 and/or platform NLP component 124-8 based on the terms index information 332. In an embodiment, the one or more phrase entries may also be sorted, such as, for example, in chronological order based on the phrase occurrence information 328.

Figure 4:
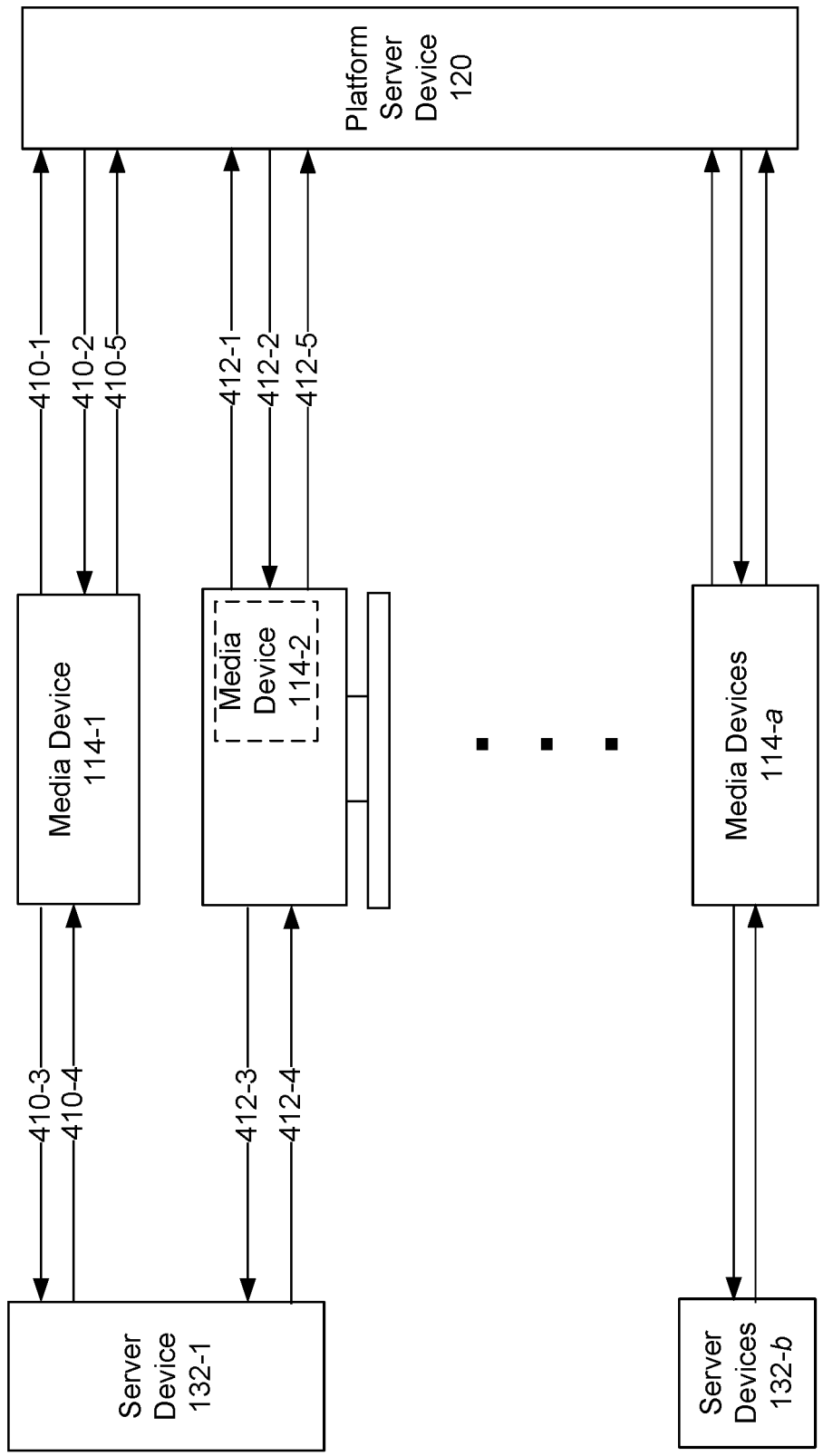
FIG. 4 illustrates interactions between media devices, server devices, and a platform device according to an example embodiment.

FIG. 4 illustrates interactions between media devices, server devices, and platform device according to an example embodiment.

In an embodiment, at step 410-1, a user or consumer of media device 114-1 may select a first content for play back and in response, the media device 114-1 may transmit a content playback request to the platform server device 120 for content location information (e.g., network address/path, etc.) associated with the first content. The content playback request may include without limitation, content identifier information that identifies the first content selected for play back.

At step 410-2, the platform server device 120 may transmit a content playback response to the media device 114-1 in response to receiving the request from media device 114-1, where the transmitted content playback response includes at least the content location information and content description information for the first content. The response may also include a content indexing request to generate content index information for the first content, when the platform server device 120 determines that a reliable or crowd sourced content index information has not yet been generated for the first content. Additionally, the content indexing request may also include language information to indicate the language of the first content. Otherwise, the platform server device 120 may exclude the content indexing request, when a reliable or crowd sourced content index information has already been determined for the first content.

At step 410-3, the media device 114-1 may transmit a content request to the server device 132-1 to receive and/or stream the first content, in response to receiving the content playback response transmitted by the platform server device 120 at step 410-2.

At step 410-4, the media device 114-1 may receive at least a portion of the first content transmitted or streamed from the server device 132-1, where the media device 114-1 may continuously receive additional portions of the first content transmitted and/or streamed from the server device 132-1 until the first content has been entirely received from the start time to the end time. The media device 114-1 may also generate content index information for the first content as previously discussed with respect to FIGS. 2 and 3A-3C.

At step 410-5, the platform server device 120 may determine a reliable or crowd sourced content index information for the first content as previously discussed with respect to FIGS. 1A-D and 2, in response to receiving the generated content index information for the first content transmitted from the media device 114-1.

Similarly, at step 412-1, a user or consumer of media device 114-2 may select a second content for play back and in response, the media device 114-2 may transmit a content playback request to the platform server device 120 for content location information. The content playback request may include without limitation, content identifier information that identifies the second content selected for play back.

At step 412-2, the platform server device 120 may transmit a content playback response to the media device 114-2, in response to receiving the content playback request from media device 114-2, where the transmitted content playback response includes at least the content location information and content description information for the second content. The response may also include a content indexing request to generate content index information for the second content, when the platform server device 120 determines that a reliable or crowd sourced content index information has not yet been generated for the second content. Additionally, the content indexing request may also include language information to indicate the language of the second content. Otherwise, the platform server device 120 may exclude the content indexing request, when a reliable or crowd sourced content index information has already been determined for the second content.

At step 412-3, the media device 114-2 may transmit a content request to the server device 132-1 to receive and/or stream the second content, in response to the content playback response transmitted by the platform server device 120 at step 412-2.

At step 412-4, the media device 114-2 may receive at least a portion of the second content transmitted or streamed from the server device 132-1, where the media device 114-2 may continuously receive additional portions of the second content transmitted and/or streamed from the server device 132-1 until the second content has been entirely received from the start time to the end time. The media device 114-2 may also generate content index information for the second content as previously discussed with respect to FIGS. 2, and 3A-3C.

At step 412-5, the platform server device 120 may determine a reliable or crowd sourced content index information for the second content as previously discussed with respect to FIGS. 1A-D and 2, in response to receiving the generated content index information for the second content from the media device 114-2.

It may be appreciated that the above set of steps 410-1 through 410-5 and set of steps 412-1 through 412-5 may be performed between any of the one or more media devices 114-a, platform server device 120, and/or server devices 132-b for a variety of different content, so that as users or consumers watch their selected content on their media devices 114-a, the associated content index information may be generated and transmitted by the one or more media devices 114-a to the platform server device 120 to create the content index information collection 122-7. It may also be appreciated that the set of steps 410-1 through 410-5 and set of steps 412-1 through 412-5 may be performed in any order with respect to each other. Additionally, in some embodiments, platform server device 120 and server device 132-b may be implemented in the same device.

It may be further appreciated, that by crowd sourcing the generation of the content index information collection 122-7, the platform server device 120 may leverage existing bandwidth used to receive or stream a variety content and computation resources available on one or more media devices 114-a to passively create a reliable and searchable content index information collection 122-7 for a wide variety of content. The content index information collection 122-7 may then be utilized by the platform server index information collection 122-7 to substantially improve searching of information (e.g., terms, phrases, and/or sub-content, etc.) within content that may have otherwise been unsearchable.

Figure 5A:
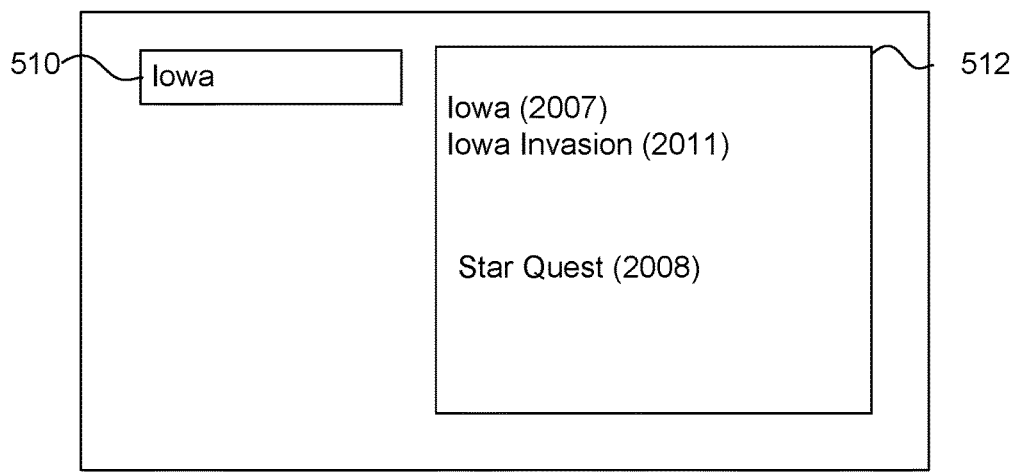
FIGS. 5A-C illustrate search user interface (UI) view, content information UI view, and playback UI view according to example embodiments.
Figure 5B:
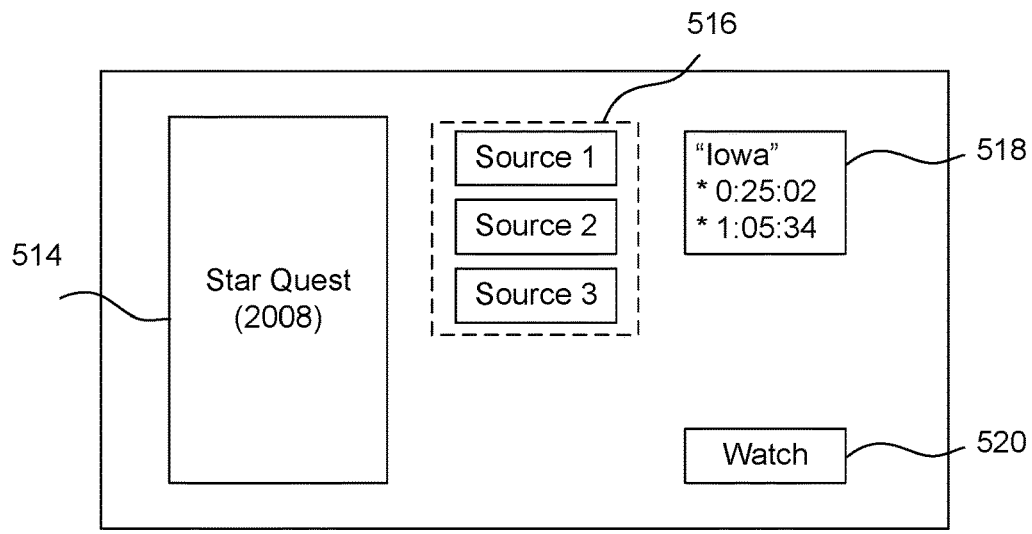
Figure 5C:
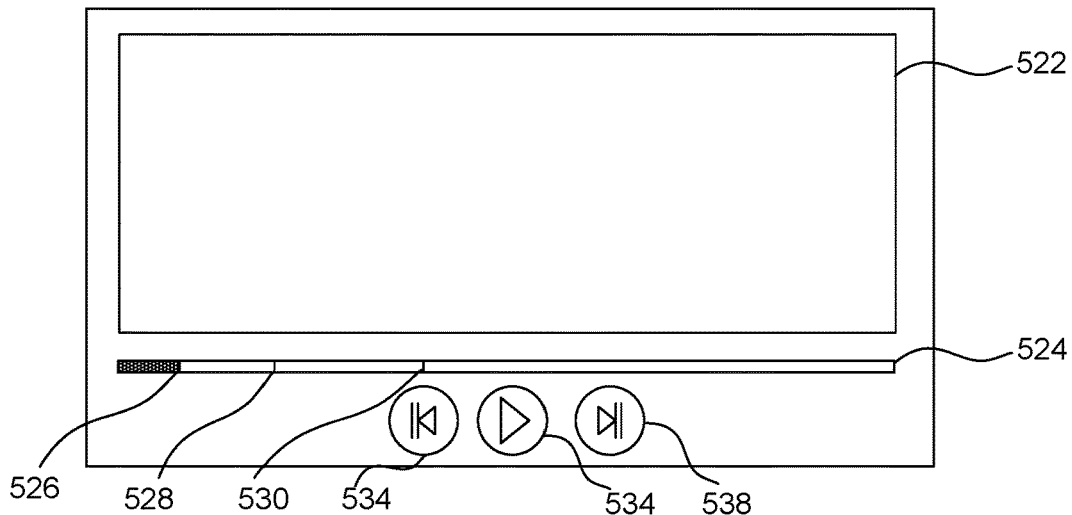

FIGS. 5A-C illustrate a search UI view, content information UI view, and content playback UI view according to example embodiments.

In the search UI view of FIG. 5A, a user or consumer of a media device (media device 114-1) may input a search query including one or more terms and/or one or more phrases in the search query UI element 510, utilizing for example, a control device (e.g., control device 116-1). The search query may be transmitted to the platform server device 120, where the platform server device 120 may perform a search and provide search results based on the received search query, content description information collection 122-6, and/or content index information collection as previously discussed with respect to FIG. 1. The media device (e.g., media device 114-1) may then receive the search results from platform server device 120 and visually and/or graphically present the search results in the search results UI element 512. After a user or consumer selects a search result (e.g., search result titled "Start Quest (2008)") which may represent a selected content, the media device (e.g., media device 114-1) may then visually or graphically present at least a portion of the content description information for the selected content in a content information UI view (e.g., content information UI view illustrated in FIG. 5B).

In the content information UI view of FIG. 5B, the media device (e.g., media device 114-1) may visually or graphically present at least the title information for and the selected content in a title information UI element 514. Additionally, the media device (e.g., media device 114-1) may also visually or graphically present at least content location information in a content location UI element 516. Furthermore, the media device (e.g., media device 114-1) may also visually or graphically present the one or more matching terms and/or phrases and at least a portion of the terms occurrence information, phrase occurrence information, and/or sub-content occurrence information in a matching information UI element 518 to illustrate the occurrences of when the one or more terms, phrases, and/or sub-content occurs within the selected content. A user or consumer may then select an available content source in the content locations UI element 516 and select the playback UI element 520 to watch and/or listen to the content in a playback UI view (e.g., playback UI view further illustrated in FIG. 5C). Additionally, the user or consumer may also further select an occurrence of the matching term (e.g., "Iowa") illustrated in matching information UI element 518 in order to watch and/or listen to the content at a particular occurrence or at a time before the occurrence (e.g., 1 second, 2 seconds, etc.) in the playback UI view.

In the playback UI view of FIG. 5C, a playback UI element 522 may visually or graphically present video information associated with the content. The progress UI element 524 may include, without limitation, a current progress UI element 526 to indicate the current progress of the content playback compared to the overall progress of the playback, and occurrence UI elements 528 and 530 to indicate the occurrence of the matching term (e.g., "Iowa") within the content. The playback UI view may further include a play UI element 534 to enable a user or consumer to "play" or "pause" the playback and a forward UI element 538 to enable a user or consumer to fast forward the playback and/or skip to the next occurrence of the matching term. Additionally or alternatively, the playback UI view may also include a reverse UI element 534 to enable a user or consumer to reverse the playback and/or skip to the previous occurrence of the matching term.

Provided herein are some of the processing operations that may be performed by one or more example embodiments. Although some of the processing operations may appear to be performed sequentially, it may be appreciated that the processing operations may not be limited to the order as illustrated and/or described. Additionally, some of the processing operations may even occur substantially simultaneously or contemporaneously with respect to other processing operations.

Figure 6:
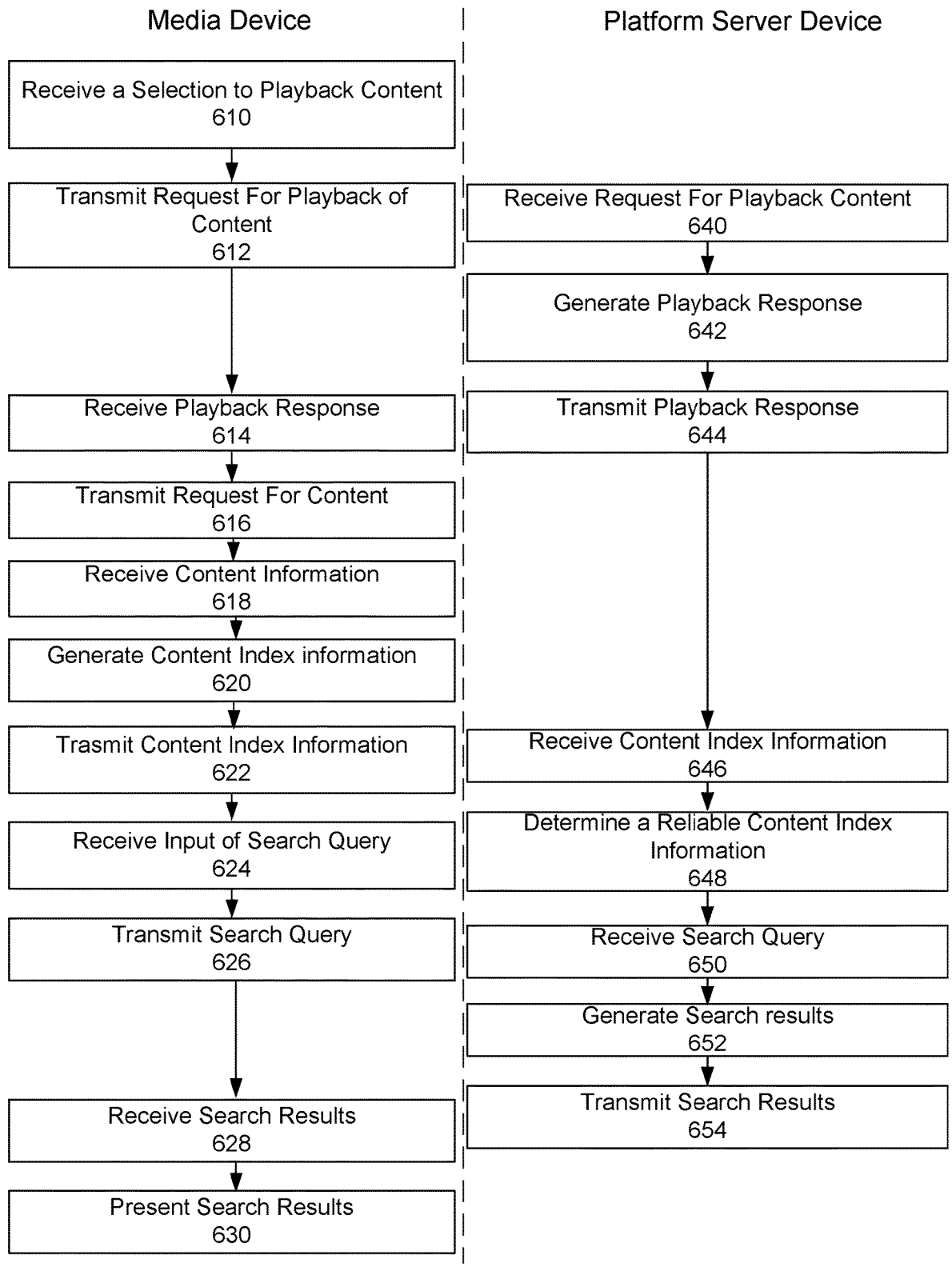
FIG. 6 illustrates processing operations that may be performed by the media device and platform server device according to example embodiments.

FIG. 6 illustrates processing operations that may be performed by a media device (e.g., media device 114-1, etc.) and platform server device 120.

With respect to a media device, at step 610, media device may receive a selection to playback content. For example, media device 114-1 may receive a selection or command based on user or consumer input utilizing a control device 116-1 from user or consumer to playback content. At step 612, the media device may transmit the request for playback of content. For example, media device 114-1 may transmit a content playback request to the platform server device 120 to request the playback of content. At step 614, the media device may receive playback response. For example, the media device 114-1 may receive a content playback response from the platform server device 120, where the playback response may include, without limitation, a content index request. Additionally or alternatively, in some embodiments, the media device 114-1 may receive the content index request from platform server device 120 without performing any of the steps of 610 or 612, where the media device 114-1 may generate the content index information starting with step 616 without playback of the content on any display device. At step 616, the media device may transmit request for content. For example, media device 114-1 may transmit a content request to server device 132-1 to request for the selected content based on the received content indexing request and/or playback response.

At step 618, the media device may receive content information. For example, the media device 114-1 may receive content information representative of at least a portion of the content. At step 620, the media device may generate content index information. For example, the media device 114-1 may generate content index information based on the content index request.

It may be appreciated that during a chronological playback or automated indexing of the selected content, steps 618 and 620 may be repeated until the entire content has been received and processed for generation of the content index information. At step 622, the media device may transmit the generated content index information. For example, media device 114-1 may transmit the content index information to the platform server device 120.

At step 624, the media device may receive input of search query. For example, media device 114-1 may receive input of a search query including one or more search terms from a user or consumer, where at least one search term is a term within the selected content. At step 626, the media device may transmit the search query. For example, media device 114-1 may transmit the search query to the platform server device 120. At step 628, media device may receive search results. For example, media device 114-1 may receive search results from the platform server device 120, where the search results may include content description information and/or content index information for the previously selected content. At step 630, the media device may present search results. For example, the media device may present search results including the content description information and/or content index information in the search UI view and content information UI view of FIGS. 5A-B. The examples are not limited in this context.

With respect to a platform server device, at step 640, the platform server device may receive request for playback content. For example, platform server device 120 may receive the content playback request for playback of content transmitted by the media device 114-1 at step 612. At step 642, the platform server device may generate playback response. For example, platform server device 120 may generate playback response including at least content location information for the selected content, when the platform server device 120 determines that reliable or crowd sourced content index information already exists for the selected content. Additionally or alternatively, platform server device 120 may generate playback response including at least content location information and the content index request, when the platform server device 120 determines that reliable or crowd sourced content index information does not already exist.

At step 644, the platform server device may transmit the playback response. For example, platform server device 120 may transmit the playback response, which may be received by the media device 114-1 at step 614. At step 646, the platform server device may receive content index information. For example, the platform server device 120 may receive content index information transmitted by the media device 114-1 at step 622, when the generate playback response includes the content index request. At step 648, the platform server device may determine a reliable or crowd sourced content index information. For example, the platform server device may determine a reliable or crowd sourced content index information for the selected content, and determine that the content index information received from media device 114-1 at step 646 as the reliable or crowd sourced content index information based on index reliability information of the content index information.

At step 650, the platform server device may receive search query. For example, the platform server device 120 may receive a search query transmitted from media device 114-1 at step 626. At step 650, the platform server device may generate search results. For example, the platform server device 120 may generate search results by matching the one or more terms in the search query with terms, phrases, and information associated with sub-content in at least the content index information collection 122-7. At step 654, the platform server device may transmit the search results. For example, the platform server device 120 may transmit the search results which may include the previously selected content. The examples are not limited in this context.

It may be appreciated that by repeatedly performing at least steps 610-630 and steps 640-654 of FIG. 6 with respect to one or more media devices 114-*a*, one or more server devices 132-*b*, platform server device 120, and variety of content, crowd source indexing and/or searching system 100 may generate a searchable, reliable or crowd sourced content index information for the variety of content, so that a user of crowd source indexing and/or searching system 100 may quickly and easily search within content that otherwise would not have been possible.

It may be further appreciated that while some of the above example embodiments illustrated in FIGS. 1A-D, 2, 3A-C, 4, 5A-B, and/or 6 may have been described in substantial detail with respect to media devices 114-1, 114-2, control device 116-1, and/or server device 132-1 the example embodiments are not limited to those contexts and/or devices. As such, the example embodiments may be similarly implemented in some or all media devices 114-*a*, control devices 116-*a*, and/or server devices 132-*b*.

EXAMPLE COMPUTER SYSTEM

Various embodiments and components therein can be implemented, for example, using one or more well-known computer systems, such as, for example, platform server device 120, client devices 110-*a*, display devices 112-*a*, and/or server devices 132-*b* shown in FIG. 1. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Figure 7:
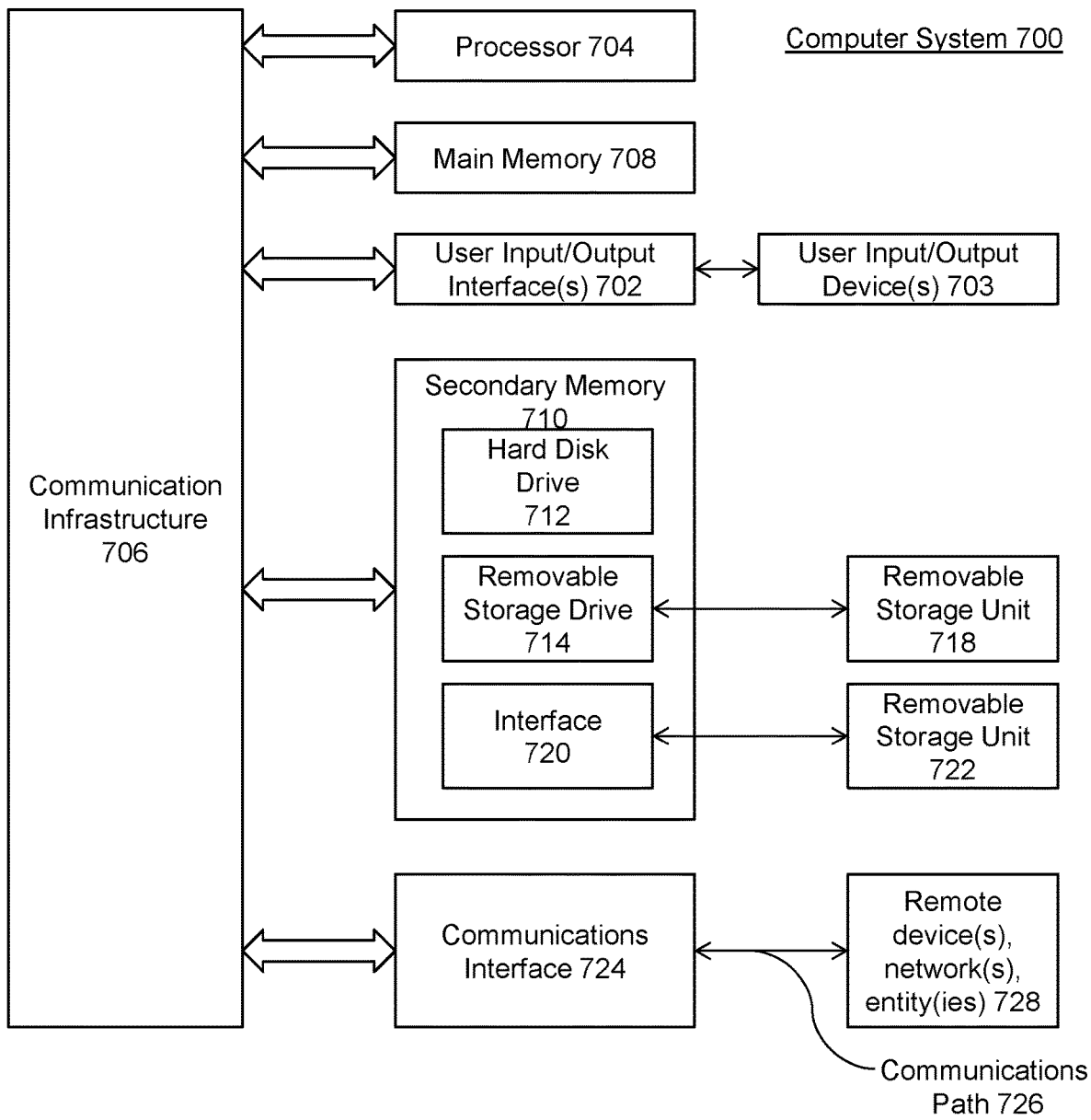
FIG. 7 illustrates an example computer system useful for implementing various embodiments.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. An apparatus comprising:
    at least one processor; and
    a memory operatively coupled to the at least one processor, wherein the at least one processor is configured to:
        receive, by the apparatus, content information associated with selected content, wherein the received content information includes one or more titled segments and one or more non-titled segments;
        output, by the apparatus, audio and/or video information on a display device operatively coupled to the apparatus to play the selected content; and
        during playback of the selected content, generate, by the apparatus, content index information for the one or more titled segments based at least on an audio portion of the selected content and disable generation of context index information for the one or more non-titled segments, wherein the generated content index information for the selected content is used with other content index information generated for the selected content to determine crowd sourced content index information for the selected content.

2. The apparatus of claim 1, wherein the at least one processor is further configured to:
    receive, by the apparatus from a control device, a selection to play the selected content on the display device; and
    request, by the apparatus, the selected content, in response to the selection from a user via the control device.

3. The apparatus of claim 1, wherein the at least one processor configured to generate the content index information is further configured to:
    recognize, by the apparatus, one or more utterances in the audio portion of the one or more titled segments of the content information associated with the selected content while the selected content is played on the display device;
    determine, by the apparatus, one or more terms and associated term occurrence information based at least on the recognized one or more utterances; and
    generate, by the apparatus, the content index information based at least on the one or more terms and associated term occurrence information.

4. The apparatus of claim 1, wherein the content index information includes index description information, terms index information, sub-content index information, and phrases index information.

5. The apparatus of claim 4, wherein the index description information includes content identifier information, abbreviated content description information, and index reliability information.

6. The apparatus of claim 4, wherein the terms index information includes one or more term entries, and each term entry comprises term information and one or more term occurrence information.

7. The apparatus of claim 1, wherein the at least one processor is further configured to:
    transmit, by the apparatus, a search query to search for content, wherein the search query includes one or more search terms;
    receive, by the apparatus, search results including at least a portion of content description information and content index information for content that includes at least one term of the one or more search terms; and
    provide, by the apparatus, the search results to the display device for visual presentation and selection.

8. A tangible computer-readable medium having instructions stored thereon that, when executed by a media device, cause the media device to perform operations comprising:
    receiving, by the media device, content information associated with selected content, wherein the received content information includes one or more titled segments and one or more non-titled segments;
    outputting, by the media device, audio and/or video information on a display device to play the selected content; and
    during playback of the selected content, generating, by the media device, content index information for the one or more titled segments based at least on an audio portion of the selected content and disabling generation of context index information for the one or more non-titled segments, wherein the generated content index information for the selected content is used with other content index information generated for the selected content to determine crowd sourced content index information for the selected content.

9. The computer-readable medium of claim 8, the operations further comprising:
    receiving, by the media device from a control device, a selection to play the selected content on the display device; and
    requesting for the selected content, in response to the selection to play the selected content.

10. The computer-readable medium of claim 8, wherein the instructions to generate the content index information, when executed by the media device, further cause the media device to perform operations comprising:
    recognizing, by the media device, one or more utterances in the audio portion of the one or more titled segments of the content information associated with the selected content while the selected content is played on the display device;
    determining, by the media device, one or more terms and associated term occurrence information based at least on the recognized one or more utterances; and
    generating, by the media device, the content index information based at least on the one or more terms and associated term occurrence information.

11. The computer-readable medium of claim 8, wherein the content index information includes index description information, terms index information, sub-content index information, and phrases index information.

12. The computer-readable medium of claim 11, wherein the index description information includes content identifier information, abbreviated content description information, and index reliability information.

13. The computer-readable medium of claim 11, wherein the terms index information includes one or more term entries, and each term entry comprises term information and one or more term occurrence information.

14. A method, comprising:
    receiving, by a media device, content information associated with selected content, wherein the received content information includes one or more titled segments and one or more non-titled segments;
    outputting, by the media device, audio and/or video information on a display device to play the selected content; and
    during playback of the selected content, generating, by the media device, content index information for the one or more titled segments based at least on an audio portion of the selected content and disabling generation of context index information for the one or more non-titled segments, wherein the generated content index information for the selected content is used with other content index information generated for the selected content to determine crowd sourced content index information for the selected content.

15. The method of claim 14, further comprising:
receiving, by the media device from a control device, a selection to play the selected content on the display device; and
requesting for the selected content, in response to the selection to play the selected content.

16. The method of claim 14, wherein generating the content index information comprises:
recognizing, by the media device, one or more utterances in the audio portion of the one or more titled segments of the content information associated with the selected content while the selected content is played on the display device;
determining, by the media device, one or more terms and associated term occurrence information based at least on the recognized one or more utterances; and
generating, by the media device, the content index information based at least on the one or more terms and associated term occurrence information.

17. The method of claim 14, wherein the content index information includes index description information, terms index information, sub-content index information, and phrases index information.

18. The method of claim 17, wherein the index description information includes content identifier information, abbreviated content description information, and index reliability information.

19. The method of claim 17, wherein the terms index information includes one or more term entries, and each term entry comprises term information and one or more term occurrence information.

* * * * *